United States Patent
Morris (10) Patent No.: US 7,108,335 B2
(45) Date of Patent: *Sep. 19, 2006

(54) PLASTIC WHEEL ASSEMBLY, MOUNTING SLEEVE AND UNIVERSAL AXLE

(75) Inventor: Michael A. Morris, Menlo Park, CA (US)

(73) Assignee: GEO Plastics, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/835,653

(22) Filed: Apr. 30, 2004

(65) Prior Publication Data

US 2004/0262984 A1    Dec. 30, 2004

Related U.S. Application Data

(63) Continuation-in-part of application No. 10/696,308, filed on Oct. 28, 2003, now abandoned, which is a continuation of application No. 10/044,621, filed on Jan. 9, 2002, now Pat. No. 6,637,835, which is a continuation-in-part of application No. 09/687,669, filed on Oct. 12, 2000, now Pat. No. 6,361,121, which is a continuation-in-part of application No. 09/507,595, filed on Feb. 18, 2000, now Pat. No. 6,375,274.

(51) Int. Cl.
*B60B 23/00* (2006.01)
*B60B 27/02* (2006.01)

(52) U.S. Cl. .............................. 301/111.01; 301/111.03

(58) Field of Classification Search ........... 301/111.01, 301/112, 118, 120–121, 111.03, 111.04, 132
See application file for complete search history.

(56) References Cited

U.S. PATENT DOCUMENTS

| | | |
|---|---|---|
| 486,023 A | 11/1892 | Bermel |
| 2,978,277 A | 4/1961 | Gaudry |
| 3,907,370 A | 9/1975 | Bard |
| 5,215,356 A | 6/1993 | Lin |
| 5,222,786 A | 6/1993 | Sovis et al. |
| 5,277,480 A | 1/1994 | Chiu |
| 5,603,555 A | 2/1997 | Dickey et al. |
| 5,716,107 A | 2/1998 | Parker et al. |
| 5,902,018 A | 5/1999 | Owen et al. |
| 6,099,083 A | 8/2000 | Logan |
| 6,280,001 B1 | 8/2001 | Parker et al. |
| 6,299,258 B1 | 10/2001 | Wright et al. |
| 6,361,121 B1 | 3/2002 | Morris |
| 6,375,274 B1 | 4/2002 | Morris |
| 6,409,283 B1 | 6/2002 | Hsieh |
| 6,637,835 B1 | 10/2003 | Morris |
| 2004/0070263 A1* | 4/2004 | Morris ................. 301/111.04 |

FOREIGN PATENT DOCUMENTS

EP          0180307 A1    5/1986

* cited by examiner

*Primary Examiner*—Jason R. Bellinger
(74) *Attorney, Agent, or Firm*—Dorsey & Whitney LLP (57) ABSTRACT

A plastic wheel assembly (122, 222) and wheel mounting sleeve (127, 227) used to releasably secure the wheel (122, 222) onto an axle (123, 223). The wheel mounting sleeve (127, 227) includes an axle stabilizing opening (100, 200) positioned in an end wall (158, 258) of the sleeve which receives an axle outer end or axle stub (199, 299) that supports the axle (123, 223) against lateral loading and stabilizes it to reduce wobble, chatter and vibration. The opening (100, 200) permits visual confirmation of proper section of the axle outer end (199, 299) in the opening (100, 200). A universal axle (223, 223a) is also provided which can be used to couple wheels (122, 222) having shaped axle bores (139, 239) to the axle using wheel mounting sleeves (127, 227), as well as being used to couple wheels (420), having straight or substantially cylindrical bores (439), to the axle using conventional fasteners (450, 461, 470).

35 Claims, 9 Drawing Sheets

FIG._13 ifts on the end of the axle. The sleeve mates with spokes in a wheel recess and is held in place by a washer and cotter pin. An annular cap is placed over the
PLASTIC WHEEL ASSEMBLY, MOUNTING SLEEVE AND UNIVERSAL AXLE

RELATED APPLICATIONS

This is a continuation-in-part application based upon application Ser. No. 10/696,308, filed Oct. 28, 2003 now abandoned and entitled PLASTIC WHEEL ASSEMBLY AND MOUNTING SLEEVE WITH STABILIZING RECESS, which was a continuation application based upon application Ser. No. 10/044,621, filed Jan. 9, 2002 and entitled PLASTIC WHEEL ASSEMBLY AND MOUNTING SLEEVE WITH STABILIZING RECESS, now U.S. Pat. No. 6,637,835, which was a continuation-in-part application based upon application Ser. No. 09/687,669, filed Oct. 12, 2000 and entitled PLASTIC WHEEL ASSEMBLY AND IMPROVED MOUNTING SLEEVE THEREFOR, now U.S. Pat. No. 6,361,121, which was a continuation-in-part application based upon application Ser. No. 09/507,595, filed Feb. 18, 2000 and entitled PLASTIC WHEEL ASSEMBLY AND MOUNTING SLEEVE THEREFOR, now U.S. Pat. No. 6,375,274.

TECHNICAL FIELD

The present invention relates, in general, to wheel assemblies and the manner of their mounting to and removal from an axle, and more particularly, relates to plastic wheel assemblies of the type used on refuse carts, wheeled coolers, wagons, wheeled toys, barbecues or the like, and axles therefor.

BACKGROUND ART

The use of plastic wheels on a variety of products has dramatically increased in recent years. One area where such plastic wheels have been widely employed is on wheeled refuse or garbage carts or bins of the type commonly employed by homeowners for their trash. Typically, these carts are formed of an injection, blow or rotationally molded plastic and have injection, blow, rotation or compression molded plastic wheels which are mounted on the ends of a metal axle by a hub member or push-on hat fastener (sometimes referred to as "pawl nut"). The wheel hub is hammered onto the end of the axle to hold the wheel in place. Removal of such plastic wheels in order to replace or repair the wheel or the cart has been difficult because the hammered push-on hat fasteners or hubs require special tools for their removal or essentially must be destroyed to remove them from the axle. Sometimes this process also damages the axles. Thus, more recently, wheel-mounting sleeve assemblies have been devised which snap-on to the axle to hold the wheel to the axle.

As the size of the axle and wheel are reduced, for example, when such wheel assemblies are used on wheeled toys, wagons, coolers or the like, the amount of material which can be employed in a wheel mounting sleeve to stabilize the coupling of the axle to the wheel decreases. Since such mounting sleeves often employ resiliently transversely displaceable fingers to lock or latch the wheel to the axle, the area of the sleeve which includes the displaceable finger tends to be somewhat less stable and less capable of supporting shifting or rocking along the axle and transverse loads on the axle. The stability decreases as the sleeve size decreases and there is less material to engage and hold onto, or latch to, the axle and to resist axial shifting and transverse loading in the area of the resiliently transversely displaceable fingers, which usually are located proximate an outer end of the axle.

Prior art snap-on wheel-mounting assemblies have been unduly complex, visually unappealing, and not well suited to the shock loading and vibration which is commonly encountered. They also are not easily adaptable for use on smaller axles and smaller wheeled products. Moreover, the cost of prior art snap-on couplings has been undesirably high, as has their rate of failure.

Most wheel mounting sleeves typically require a wheel having a central wheel bore which is formed with shoulders which cooperate with the sleeves to lock or latch the sleeve to the wheel. The sleeve further is formed to latch the sleeve to a circumferentially extending notch provided on axles in wide spread use in the industry.

As set forth in my U.S. Pat. No. 6,637,835, an improved axle has been devised which has a stub extension beyond the conventional notch that seats in a recess in the wheel mounting sleeve to stabilize the end of the axle in the sleeve. Wheeled product manufacturers, however, would prefer having an axle which can be used with standard wheels having straight (cylindrical) bores, as well as with wheel mounting sleeves and wheels with cooperating, stepped wheel bores. Thus it would be highly advantageous to provide a universal axle structure that can be used with any one of push-on hat fasteners, washer and cotter pin assemblies, hub inserts and wheel mounting sleeves.

Typical prior art wheel-mounting assemblies can be seen in U.S. Pat. Nos. 486,023, 2,978,277, 3,907,370, 5,215,356, 5,222,786, 5,277,480, 5,603,555, 5,716,107, 5,902,018 and 6,099,083 and in published European Patent Application No. 0 180 307.

U.S. Pat. No. 486,023 to Bermel discloses an axle nut used to secure a wheel on a somewhat involved axle structure. Another wheel retaining axle nut is shown in U.S. Pat. No. 6,099,083 that also is designed for use with a cooperatively formed and unique notched axle.

In U.S. Pat. No. 2,978,277 to Gaudry a two-piece hub assembly is used to secure a wheel on an axle stub. The two hub halves are forced together to simultaneously capture the head of the axle and a dove-tailed cross section of the wheel. This approach is based, in part, upon mating frictional engagement of the hub halves, but under the shock loading and high vibration which refuse carts, cooler and toys typically experience, frictional securement of components can be unreliable. The need for multiple hub pieces and an axle with an enlarged head, also is not desirable and the end of the axle is not supported well against transverse loading.

The wheel-mounting assembly of U.S. Pat. No. 3,907,370 to Bard employs a mounting sleeve which is keyed to slide over the keyed end of a specially formed axle. The sleeve mates with spokes in a wheel recess and is held in place by a washer and cotter pin. An annular cap is placed over the cotter pin and washer. This approach requires axle keying, a plurality of parts, the use of tools to secure and release the cotter pin and cap, and a laterally unsupported axle end.

A multiple piece hub assembly is shown in U.S. Pat. No. 5,716,107 to Parker et al. In this wheel-mounting assembly a retainer member is used to lock the wheel assembly on a groove or annular notch at the end of the axle. The hub cover is snapped into the wheel and then the wheel snapped onto the axle. Such notched or grooved axles are in wide spread use in connection with trash carts, but this assembly again requires multiple pieces and, in this case, special tools and tedious manipulation are required in order to release the resilient retainer ring fingers from the inside of the wheel so that the wheel can be removed from the axle. A similar snap-on hub assembly is shown in U.S. Pat. No. 5,215,356. In both U.S. Pat. Nos. 5,716,107 and 5,215,356 the wheel securing device is not a sleeve which extends through the wheel bore.

Four patents which employ sleeve assemblies formed for mounting through the wheel in telescoped relation over the axle are shown in U.S. Pat. Nos. 5,222,786, 5,277,480, 5,603,555 and 5,902,018. The devices of U.S. Pat. Nos. 5,222,786 and 5,603,555 have sleeves with at least one snap-acting, axle-engaging shoulder thereon which releasably retains the sleeve on the axle and at least one wheel-engaging shoulder retaining the wheel on the sleeve. As will be seen, however, both of the wheel-mounting sleeve assemblies in these patents are relatively complex and employ a plurality of pieces in order to secure the wheel on the axle. As the wheel and axle size reduces, therefore, these assemblies become more difficult to employ.

In U.S. Pat. Nos. 5,277,480 and 5,902,018 separate retainer devices are used with sleeves, but the outer ends of the axles are essentially unsupported and hub covers must be employed for safety and/or aesthetic reasons.

Finally, in European publication No. 0 180 307 collets are provided on an inwardly cantilevered stub of the wheel to grip a notch formed in the axle. No through-the-wheel sleeve is employed in this assembly.

Accordingly, it is an object of the present invention to provide a wheel assembly and wheel mounting sleeve having a minimum number of parts which can be used to mount plastic wheels to notched or grooved metal axles.

A further object of the present invention is to provide a plastic wheel assembly for a trash cart, wagon, cooler or other wheeled product which is economical to manufacture, easy to mount to the axle, and is durable, stable and capable of withstanding substantial shock loads, side-to-side shifting and vibration during normal use.

Another object of the present invention is to provide a universal axle assembly which can be used with conventional straight bore wheels and conventional fastening devices, as well as with wheel mounting sleeves for wheels with cooperatively formed wheel bores.

Still another object of the present invention is to provide an axle wheel mounting sleeve and wheel in which the assembly formation of the wheel is easier to accomplish and proper seating of the axle and securement of the wheel thereon can be confirmed.

The wheel assembly axle and wheel mounting sleeve of the present invention have other objects and features of advantage which will become apparent from, and are set forth in more detail in, the accompanying Drawing and following Best Mode Of Carrying Out The Invention.

DISCLOSURE OF THE INVENTION

In one aspect of the present invention, a wheel assembly is provided which comprises, briefly, an axle having a circumferentially extending notch therein inwardly of an outer end of the axle; a wheel having a wheel bore extending from an inner side to an outer side of the wheel; and a wheel mounting sleeve mounted in the wheel bore, the sleeve having a sleeve bore mounted over the axle and coupled thereto, the sleeve further having a wall extending transversely at least partially across the sleeve bore on the outer side of the wheel, the wall defining an opening therein dimensioned to receive and transversely support the outer end of the axle, and the opening having a portion extending to the outer side of the wheel for visual confirmation of seating of the outer end of the axle in the opening.

Figure 3:
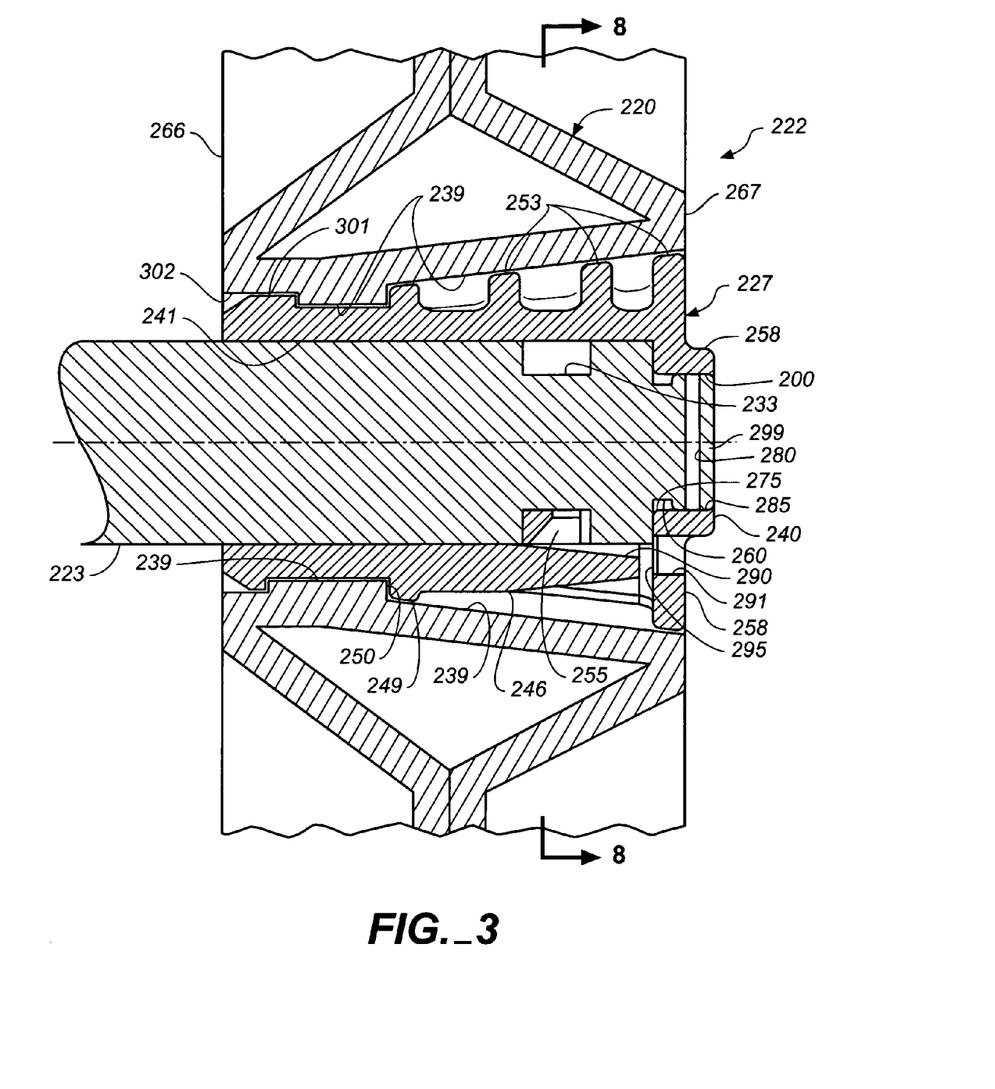
FIG. 3 is an enlarged, fragmentary, side elevation view corresponding to FIG. 2 of an alternative embodiment of the wheel assembly, wheel mounting sleeve and axle of the present invention.

In another aspect, a wheel mounting sleeve is provided comprising, briefly, a sleeve body for mounting in a central wheel bore and having a sleeve bore dimensioned for mounting on an axle; the sleeve body including at least one axle-engaging shoulder retaining the sleeve on the axle, and the sleeve body having a transversely extending end wall having an opening therethrough dimensioned to receive an outer end of the axle for support of transverse loads on the axle by the end wall of the sleeve and for visual confirmation of seating of the axle in the opening. As shown in FIG. 3, the opening extends in an axial direction through the transverse end wall of the sleeve.

In a further aspect of the present invention, a universal axle is provided which comprises, briefly, an axle body dimensioned for slidable mounting in either a straight cylindrical wheel bore of a conventional wheel or a mounting sleeve positioned in a stepped or shaped wheel bore. The axle has a circumferentially extending notch proximate and inward of an outer end of the axle body, the axle body extends beyond the notch and is formed for securement of a straight bore conventional wheel to the outer end of the axle body by a fastening device, and also is formed for securement of a stepped or shape bore wheel to the axle body by a wheel mounting sleeve.

BEST MODE OF CARRYING OUT THE INVENTION

The axle, wheel mounting sleeve and wheel assembly of the present invention can be used in connection with numerous wheeled devices. A typical, but not limiting, application is to employ the same in a wheeled refuse cart or container of the general type shown in FIG. 1. Thus, cart 21 includes a pair of wheels 22 mounted on an axle 23 to the lower end of the cart body 29. A hinged lid 24 optionally can be provided, and the cart can be tilted or tipped about the wheels using handle 26 so as to enable rolling of the cart for the transport of refuse, for example, between a location for filling the cart and a location for pickup by a refuse disposal company.

Figure 1:
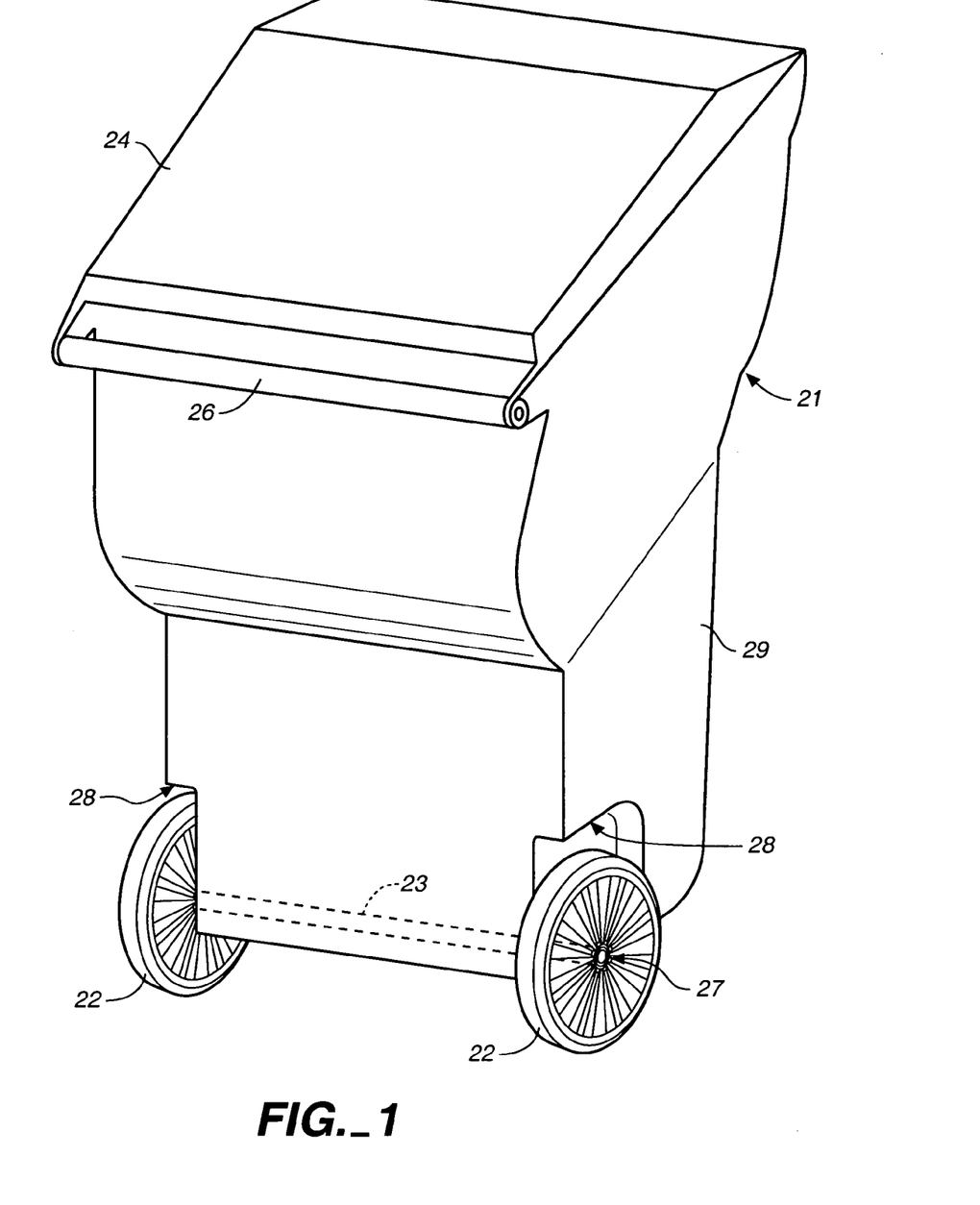
FIG. 1 is a top perspective view of a refuse cart or container having a wheel assembly mounted thereto which is constructed in accordance with the present invention.

Wheels 22 are secured on axle 23 by a wheel mounting sleeve, generally designated 27 or by a fastening device (not shown) such as a push-on hat fastener washer and cotter pin or hub assembly. In the refuse cart illustrated, body 29 of the cart includes a wheel well or recess area 28 which receives wheels 22, in part to protect the wheels and in part as a cosmetic structure. Many carts, however, do not include wheel wells as illustrated.

Similar wheeled products which generally are smaller in size include wagons, wheeled food and beverage coolers, barbecues, wheeled toys and small refuse containers. Again, the wheels employed on such devices may be secured to axles using a wheel mounting sleeve or fastening assemblies, but since the wheels, axles and sleeves are much smaller, problems of stability and durability of the assembly arises as less material is available to couple the components together.

My prior Related Applications are incorporated in their entireties by reference into the present application. In U.S. Pat. No. 6,637,835, which is based upon one of the Related Applications, a mounting sleeve and axle are disclosed in which a recess in the end wall of the mounting sleeve is provided to stabilize and laterally support the axle, which is formed with a stub at the outer end. The sleeve of the present invention has been improved by providing a structure which enables seating of the outer end of the axle to be confirmed.

Figure 2:
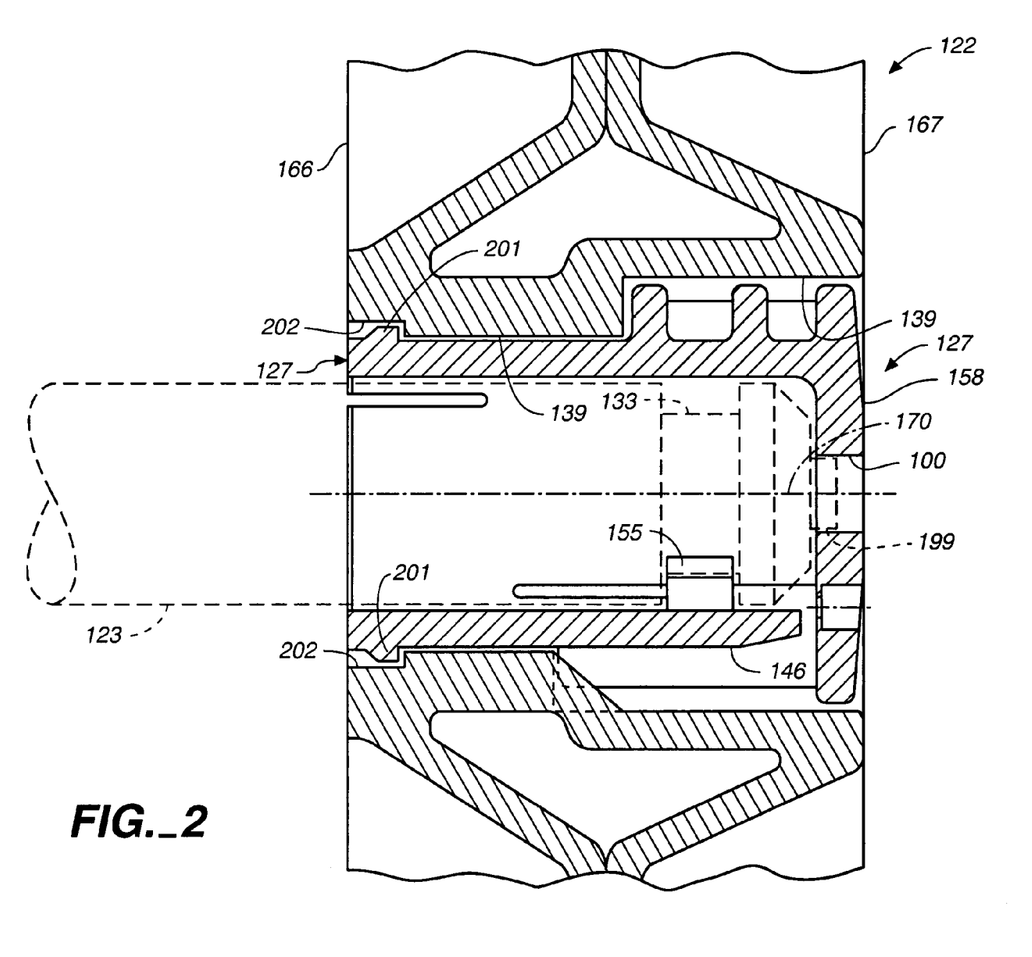
FIG. 2 is an enlarged, fragmentary, side elevation view of the wheel assembly and wheel mounting sleeve of the present invention.

FIG. 2 in this application corresponds to FIG. 2 in U.S. Pat. No. 6,637,835, which has a structure that has been described in detail in such patent and will not be repeated in such detail herein. Briefly, sleeve 127 has an inner end provided with an annular rib 201 which seats in an annular recess 202 in the central wheel bore 139 of wheel 122. Rib 201 has a diameter which is greater than bore 139, and the sleeve is press fit down bore 139 until rib 201 resiliently snaps out into recess 202. The same relative dimensions as set forth for the sleeve rib and bore diameter of the embodiments of my Related Applications are suitable for the embodiment of FIG. 2. In order to facilitate passage of rib 201 down bore 139, the body of sleeve 127 is preferably axially slotted at the inner end at least once.

As can be seen in FIG. 2, a resiliently displaceable finger 146 is provided that can be downwardly displaced. Such movement is required in order to allow the lug or tooth 155 carried by finger 146 to be displaced laterally of axle 123 and out circumferentially extending axle notch 133. Axle 123 has a tapered end that can be urged into sleeve 127 until lug 155 snaps into axle notch 133. This transverse displacement of axle-engaging finger, however, creates some transverse and axial instability in the axle/sleeve assembly under dynamic loading of the axle.

In order to stabilize the axle inside the sleeve so that it will not downwardly displace latching finger 146 under dynamic loading, the improved sleeve and wheel assembly of U.S. Pat. No. 6,637,835 was provided with a stabilizing axle recess in transverse end wall 158 of the sleeve, which recess was dimensioned to receive an axle stub or extension 199 provided on the distal or outer end of axle 123. Axle stub 199, therefore, transversely supported the axle inside sleeve 127 across the gap in support present as a result of outwardly displaceable finger 146. Stub 199 of axle 123 was trapped in the recess in end wall 158, and the axle could not downwardly displace finger 146 and permit wheel 122 to begin to wobble or vibrate dynamically on the axle.

One of the disadvantages of the sleeve of my U.S. Pat. No. 6,637,835 is that the person assembling the wheels to the axle had to feel the axle snap or seat into the notch 133 and the recess in the end wall of the sleeve. While such seating usually can be tactilely detected, there was some uncertainty in the assembly process.

Accordingly, in the improved sleeve assembly of FIG. 2, the recess of the former sleeve has been made into an opening 100 dimensioned to receive and transversely support an outer end of axle 123, which in the case illustrated in FIG. 2 is axle stub 199 beyond axle notch 133. Thus, opening 100 is not merely a recess but extends completely through transverse sleeve end wall 158 to an outer side 167 of the wheel for visual confirmation of seating of axle stub 199 in opening 100. The diameter of opening 100 is shown in FIG. 2 as being the same over its length, but it also could be stepped inwardly or outwardly and still provide at least a portion of the opening which would extend through wall 158 to allow visual confirmation of seating.

Turning now to FIGS. 3–8, an axle, mounting sleeve and wheel are shown which have been further modified from the wheel assembly of FIG. 2. Wheel 220 has an inner side 266 and an outer side 267. Wheel 220 is mounted to an axle 223 by a generally frusto-conical sleeve 227. Wheel 220 has a shaped or stepped central wheel bore 239 formed with shoulders or steps which cooperatively engage shoulders on sleeve 227, such as step 302 against which tooth or shoulder 301 can resiliently snap as sleeve 227 is urged down bore 239 from outer side 267 toward inside 266 of the wheel. Slots 251 and 252 (FIG. 5) assist in inward flexing of the tooth 301 as it is urged down bore 239.

Figure 4:
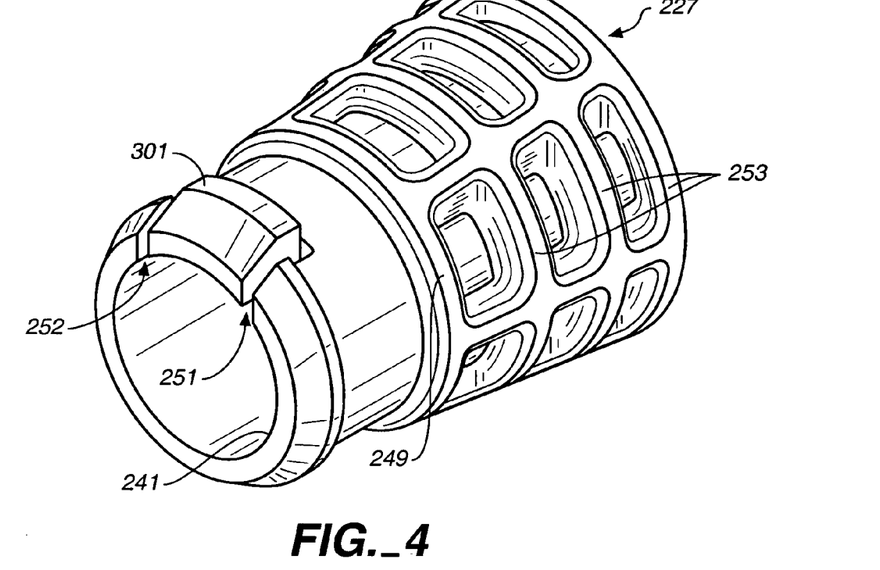
FIG. 4 is a top pictorial view of the wheel mounting sleeve of FIG. 3.
Figure 5:
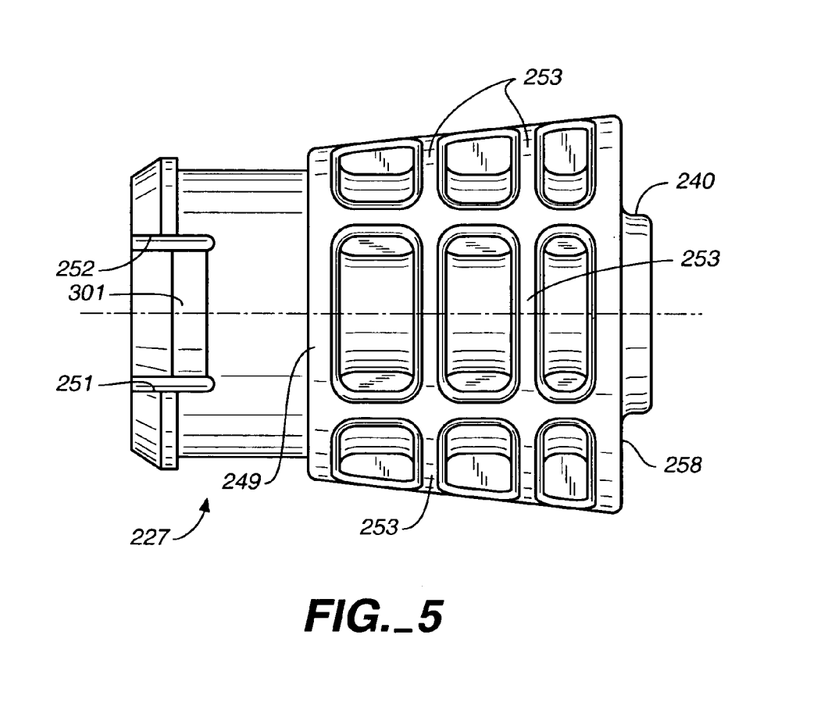
FIG. 5 is an enlarged, top plan view of the sleeve of FIG. 4.
Figure 6:
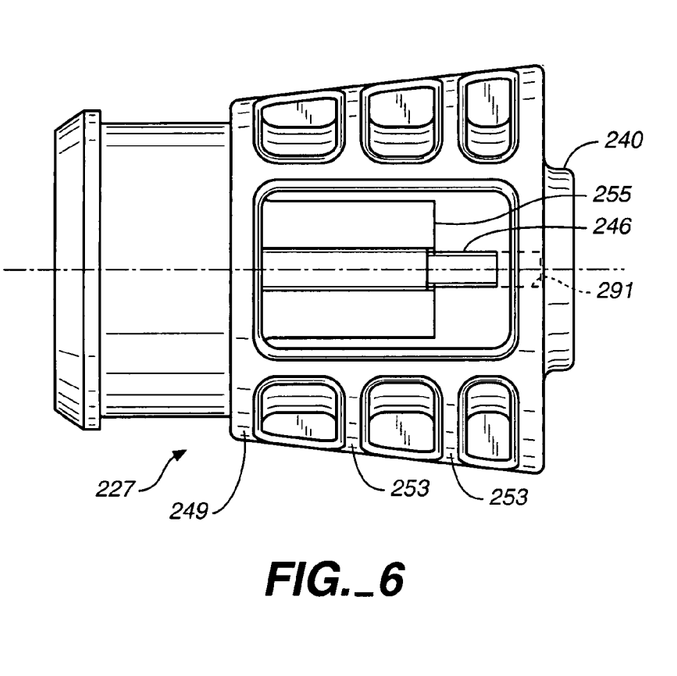
FIG. 6 is an enlarged, bottom plan view of the sleeve of FIG. 4.

An oppositely facing shoulder or step 250 in bore 239 engages sleeve annular shoulder or flange 249 to limit axial movement of the sleeve in the wheel bore. A plurality of annular reinforcing ribs 253 of progressively larger diameter are provided which give the sleeve a generally frusto-conical shape as seen in FIGS. 4–6 and reduce the quantity of plastic required to achieve the necessary sleeve strength.

Figure 8:
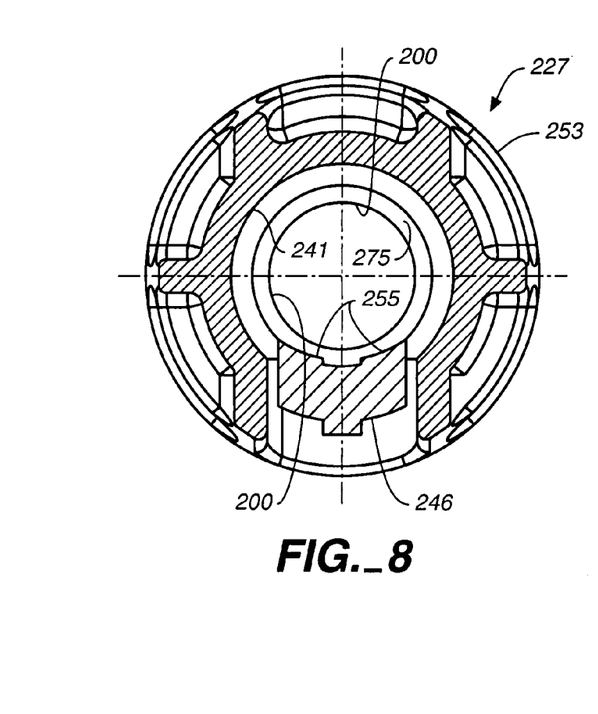
FIG. 8 is a cross sectional view of the sleeve taken substantially along the plane of line 8—8 in FIG. 3.

Mounted on a resiliently displaceable finger 246 is a lug or tooth structure 255, which can be seen in FIG. 8 as being bifurcated, and which tooth structure latches or locks sleeve 227 to axle 223 by engaging in circumferentially extending notch 233 provided in the axle proximate an outer end of the axle.

It will be apparent to one skilled in the art, therefore, that the wheel, axle and sleeve of FIGS. 3–8 of the present application, as thus far described, are essentially the same as the corresponding wheel, axle and sleeve axle of my U.S. Pat. No. 6,637,835, other than the frusto-conical shape of the sleeve and the mating shape of wheel bore 239. The function of the corresponding structures also are the same and will not be repeated herein.

The axle 223 and sleeve 227 have been altered in FIGS. 3–8 at the outer end 267 of wheel assembly 222 so as to provide additional advantages. First, axle 223 is formed with an outer end or stub 299, extending beyond notch 233, which is dimensioned for seating in an opening 200 in exterior transverse end wall 258 of the sleeve. Such seating of stub 299 in opening 200 again provides transverse stability to the axle-sleeve assembly, as described above in connection with FIG. 2. Additionally, opening 200 is defined by a collar or annular flange 240. Thus, opening 200 extends to the outer side of the wheel for visual confirmation of seating of axle 223 in opening 200.

As will be seen by comparing FIGS. 2 and 3, axle 223 has an axle extension or stub 299 which differs from that of stub 199, in that there is a recess or groove 260 outwardly of notch 233. Recess 260 preferably is a circumferentially extending groove that is adapted to receive the teeth of a push-on hat fastener when the axle is used to mount a wheel having a cylindrical bore on the axle and secure it with a push-on hat fastener, as will be described in more detail below.

Also, preferably provided on axle extension or stub 299 is a transversely extending bore 280 that can be dimensioned to receive a cotter pin, as also will be described hereinafter. Thus, axle 223 of FIG. 3 is in the nature of a "universal" axle which can be used to couple wheels having shaped wheel bores onto the axle using a sleeve, such as sleeve 227, or can be used to couple wheels having cylindrical bores onto the axle using various conventional fastening devices, such as push-on hat fasteners, washer and cotter pin assemblies, and other hub fasteners. Axle stub 299 could even be threaded (not shown) to receive a lock washer and nut to couple a wheel having a straight bore to the axle.

Axle stub 299 is preferably cylindrical in cross section, as is opening 200. It will be understood, however, that the cross section of axle stub 299 and opening 200 could also be non-circular to provide planar surfaces which interengage and ensure that the axle rotates with the sleeve, which can be secured to rotate with the wheel.

Figure 7:
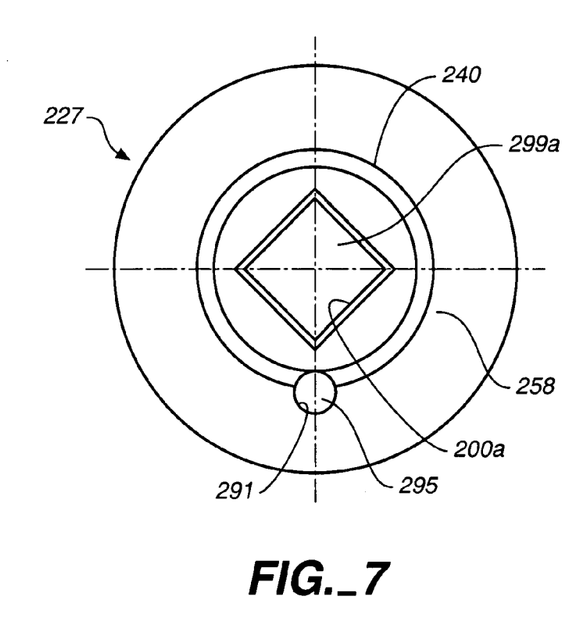
FIG. 7 is an enlarged, end elevation view of the sleeve of FIG. 4 showing an alternative embodiment of the axle outer end and a mating sleeve opening.

Such a non-circular axle/opening configuration is shown in FIG. 7. Axle stub 299a is formed to have a square cross section, while opening 200a has a mating square cross section. Interengaged planar surfaces on the axle stub on the opening in end wall 258 will cause rotation of the sleeve to be transmitted to the axle. Thus, if wheel 220 is in an interference fit inside wheel bore 239, or if a longitudinally extending key (not shown) is provided between the wheel and sleeve, the wheel and sleeve will rotate together, with sleeve rotation being transmitted to axle 223 by non-circular opening 200 and stub 299. This allows axle 299 to be used in applications, such as fertilizer spreaders, to drive a granule propelling rotor. The rotor will throw or distribute fertilizer granules, or insecticide powders or the like, based upon wheel rotation and transmission of that rotation to the sleeve and thereafter to the axle, which in turn drives the spreader rotor.

Sleeve assembly 227 of FIGS. 3–8 has other features which enhance its performance. Resilient finger 246 is formed with a tapered radially inwardly facing surface 290 which is aligned with release tool receiving bore 291. A pick, awl or "scratch-all" tool can be inserted in bore 291, break frangible wall 295 and inserted under finger 246. As the tool is axially advanced, tapered surface 290 tends to urge the finger outwardly and the tool can be used to pry the tooth structure 255 out of notch 233 to release the sleeve and wheel from the axle in a manner also described in detail in my U.S. Pat. No. 6,637,835.

Additionally, it is preferable that collar 240 which defines opening 200 have an inner convergingly tapered or rounded surface 275 which can cooperate with a rounded end 285 of axle 233. As the axle is urged down axle bore 241, therefore, rounded axle end 285 will engage round or converging collar entrance 275 and cause the axle outer end to be centered in opening 200 for urging to the fully seated position shown in FIG. 3.

Figure 9:
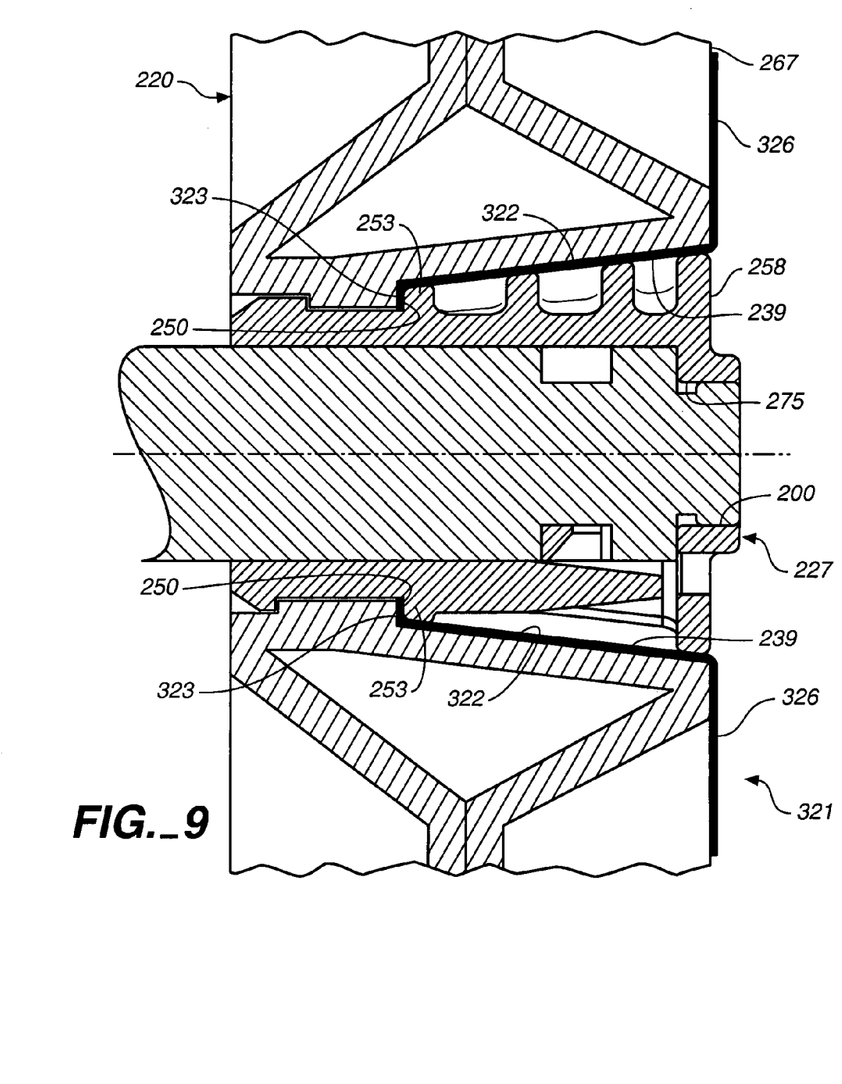
FIG. 9 is a side elevation view, in cross section, corresponding to FIG. 3 and showing attachment of a decorative insert member.

FIG. 9 illustrates the use of matingly formed, shaped, wheel bore 239 and sleeve 227 to secure a bore insert member to the wheel assembly. Bore insert member, generally designated 321, can be formed with a frusto-conical section 322 that terminates at an inner end in a radially inwardly extending flange 323, which is trapped between rib 249 of the sleeve and the shoulder or step 250 in bore 239. A radially extending annular flange 326 at the outer end of the frusto-conical section 322 abuts the outer side 267 of wheel 220. Flange 326 can provide a decorative color accent or can carry a pattern which adds to, or is complementary with, the end wall 258 of sleeve 227.

To assemble insert 321 to the wheel assembly, flange 323 is positioned behind rib 249 and then sleeve 227 is inserted into the wheel bore 239 and urged down the bore until tooth 301 snaps into notch 302, tooth 255 snaps into notch 233, and flange 323 abuts shoulder 250.

Figure 10:
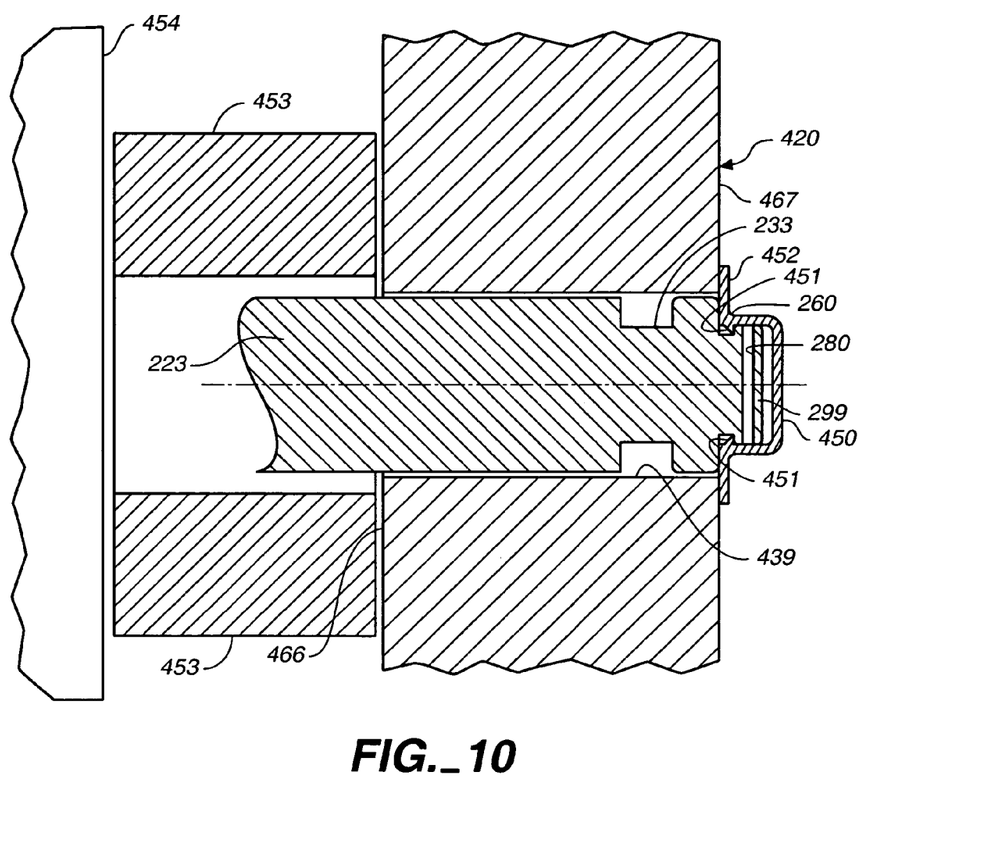
FIG. 10 is a side elevation view, in cross section, of an axle constructed in accordance with the present invention having a wheel with a cylindrical bore mounted thereto using a push-on hat fastener.
Figure 11:
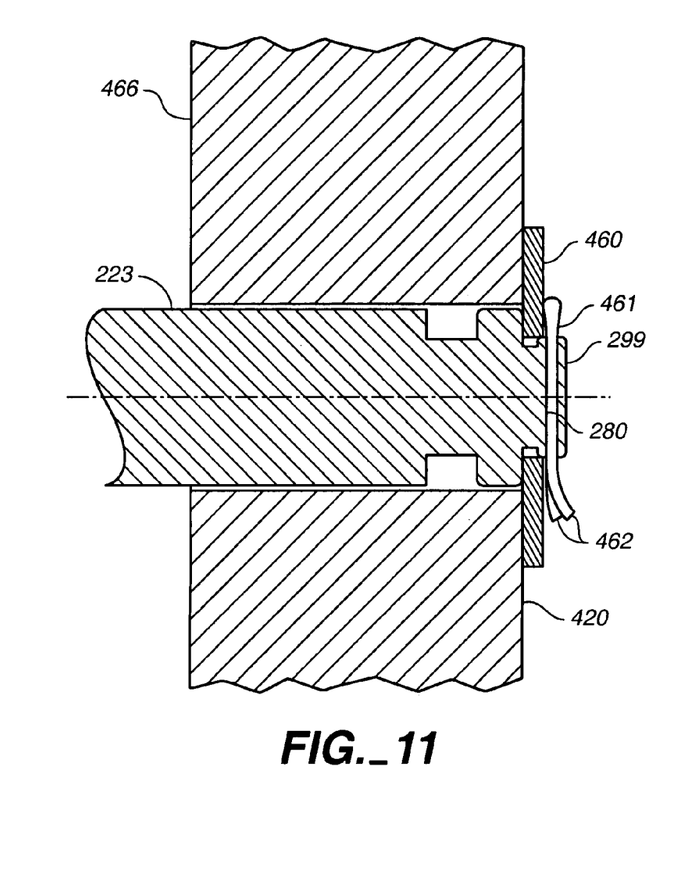
FIG. 11 is a side elevation view, in cross section, of the axle of FIG. 10 having a wheel with a cylindrical bore mounted thereto using a washer and cotter pin assembly.
Figure 12:
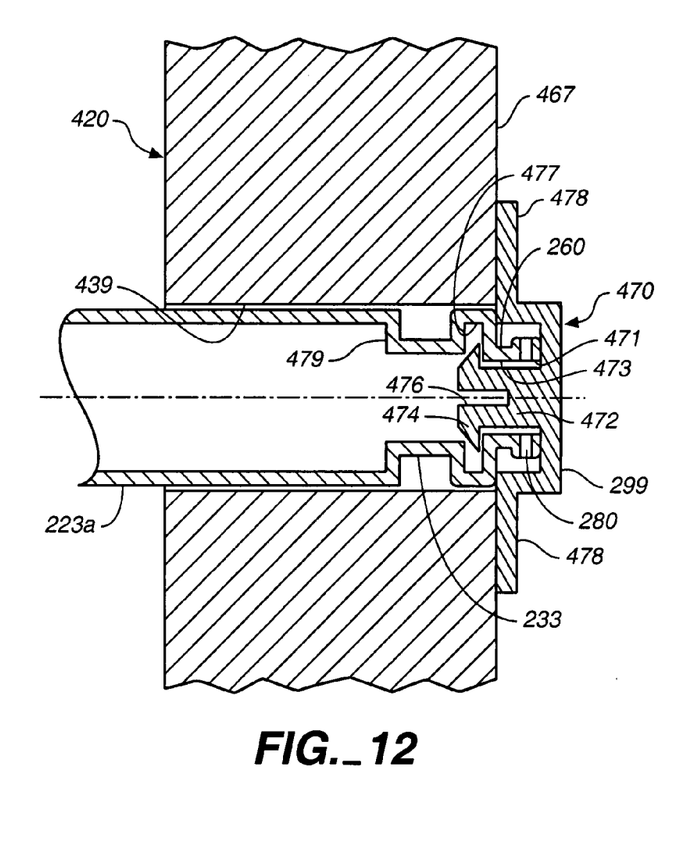
FIG. 12 is a side elevation view, in cross section, of an alternative embodiment of the axle of the present invention having a wheel with a cylindrical bore mounted thereto using an axle insert fastener member.

FIGS. 10, 11 and 12 illustrate use of the axle of the present invention and various fastening devices to secure conventional wheels, having cylindrical or relatively unshaped wheel bores, to the axle.

In FIG. 10, a wheel 420 is shown which has a cylindrical bore 439 which extends through bore 439 from an inner side 466 to an outer side 467 of the wheel. Axle 223 is formed as shown in FIG. 3 and includes an outer extension or stub 299 past notch 233 which is constructed with annular groove 260 and a transverse bore 280.

Wheel 420 is secured to axle 223 in FIG. 10 by a push-on hat fastener 450. Such push-on hat fasteners have a straw hat shape with opposed teeth 451 or pawls that extend inwardly and backwardly toward the top of the hat. Thus, the push-on hat fastener can be driven down over stub end 299 with the teeth being resiliently compressed until the hat brim 452 abuts outer end wall or surface 467, at which point fastener teeth 451 snap outwardly and engage the inwardly facing wall of groove 260. The wheel is then coupled securely against removal in an outward direction from axle 223. Typically, an annular spacer 453 engages the inner side 466 of the wheel, as well as a side wall 454 of the wheeled product.

Push-on hat fasteners also can be used with stub extensions 299 which are not grooved. In its broadest aspect, axle 223, therefore, need only extend beyond outer side 467 of wheel 420 by a distance sufficient to secure a fastening device thereto. This can be ensured in conventional wheels 420 by selection of the length of spacer sleeve 453.

Push-on hat fasteners are formed from stamped sheet metal and are available through several manufacturers, for example, through Crest Products of Lexington, Ky., and because of the teeth or pawls 451 they are often called "pawl nuts." The hat fasteners or pawl nuts are usually hammered onto axle ends, with the pawls or teeth being relatively hard and digging into the axle metal. Groove 260 helps this process by not requiring that the pawl nut teeth 451 be hard enough to dig into the axle material, which also can be a relatively hard metal.

As shown in FIG. 10, transverse bore 280 is not employed when a push-on hat fastener is used to couple the wheel to the axle. In the broadest concept of the axle of the present invention, therefore, it is not required that both a pawl nut groove 260 and a cotter pin bore 280 are both present outwardly of sleeve tooth-receiving notch 233. Instead, stub 299 need only extend beyond outer side 467 by a distance sufficient to attach a fastener to it.

FIG. 11 illustrates a wheel 420 which has been secured to axle 223 by a washer 460 and cotter pin 461. Washer 460 is mounted over the end of stub 299 and then cotter pin 461 inserted through transverse bore 280 and ends 462 of the cotter pin separated in a conventional manner. A spacer (not shown) would be provided between the inner side 466 of the wheel and the refuse cart or other wheeled product, and of course, similar wheel assembly would be mounted to the other end of axle 233.

In FIG. 12, an alternative embodiment of the axle of the present invention is shown in which an insert type of fastening device or hub has been used to secure a conventional straight bore wheel to the axle.

Wheel 420 having bore 439 is mounted on axle 223a, which is a hollow or a tubular axle. Axle 223a includes a circumferentially extending notch 233 proximate but inwardly of an outer stub end 299 of the axle. Notch 233 allows axle 223a to be used with a wheel mounting sleeve to secure a wheel to the axle using a sleeve, as described above for the embodiments of FIGS. 2 and 3.

Securement of wheel 420 on axle 223a is accomplished using an insert member 470 which is inserted into an open end 471 of axle 223a. Insert 470 can include a neck portion 472 which extends down a bore 473 of stub portion 299 of the axle. Neck 472 has an enlarged end 474 and is advantageously slotted 476 to allow the end of the insert to resiliently collapse until end 474 reaches shoulder or step 477. It will be noted that enlarged end 474 is advantageously beveled or chamfered to facilitate urging the same down bore 473. Once pushed into axle stub bore 473 until end 474 reaches step 477, the end will snap outwardly and hold insert 470 against removal from the axle. Insert 470 also includes a radially extending flange 478 which bears against outer surface 467 of the wheel and prevents removal of the wheel from the axle.

It also will be understood that neck portion 472 also can have an axial length dimension sufficient to enable enlarged end 474 engage behind shoulder 479 of the axle.

As was the case with axles 223, axle 223a can be formed with a pawl nut receiving annular groove 260 and a transverse cotter pin receiving bore 280, although one or both of these fastener cooperating structures need not be present in the broadest aspect of the present invention.

Figure 13:
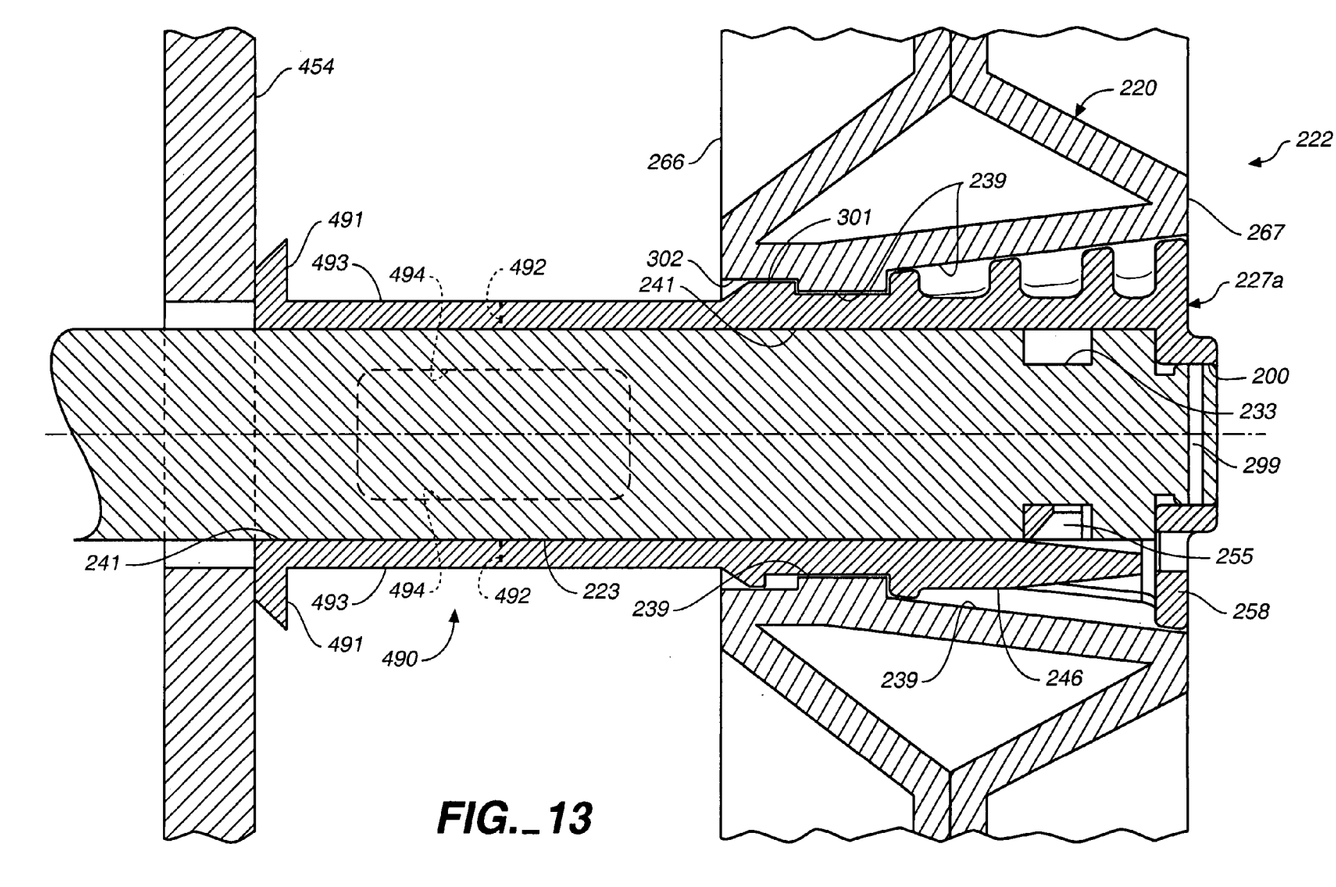
FIG. 13 is a side elevation view, in cross section, showing an alternative embodiment of the wheel mounting sleeve with a spacer extension provided thereon.

Turning now to FIG. 13, an alternative embodiment of the present wheel assembly is shown in which wheel mounting sleeve 227a is formed with an axially inwardly extending spacer section 490. As will be seen, spacer section 490 preferably includes radially outwardly protruding flanges 491 which will prevent the spacer section from sliding into over-sized openings in the cart side walls, which are found in some commercially available refuse carts. Obviously, for some carts flanges 491 are not required.

Spacer section 490 can further include slots 492 which define resilient arms 493. Arms 493 can be inwardly flexed during mounting of the sleeve to the wheel so that flanges 491 can pass down the wheel bore 239. Sleeve extension or spacer portion 490 also can be formed with openings 494 in the sides thereof to reduce the amount of material needed to form the spacer.

The improved sleeve 127 is easier to assemble and more reliable in achieving the advantages of being less susceptible to fatigue, stress fractures and accidental releases or unlatchings of the sleeve from the axle.

The foregoing descriptions of specific embodiments of the present invention have been presented for the purpose of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention and the embodiments with various modifications as are suited to the particular use contemplated. It is intended that the scope of the invention be defined by the claims appended hereto and their equivalents.

The invention claimed is:

1. A wheel assembly comprising:
an axle having a circumferentially extending notch therein inwardly of a stub end of the axle;
a wheel having a central wheel bore extending therethrough from an inner side to an outer side of the wheel; and
a wheel mounting sleeve mounted in the wheel bore and having a sleeve bore dimensioned to receive the axle, the sleeve being formed to couple the wheel to the axle against removal and being formed with a wall extending transversely at least partially across the wheel bore on the outer side of the wheel, the wall defining an opening therethrough along a central axis of the axle, the opening dimensioned to receive and laterally support the stub end of the axle beyond the notch, and the opening extending to the outer side of the wheel for visual confirmation of seating of the stub end of the axle in the opening.

2. The wheel assembly as defined in claim 1 wherein,
the sleeve includes a resilient finger carrying a tooth which engages the notch in the axle to retain the wheel on the axle.

3. The wheel assembly as defined in claim 1 wherein,
the stub end of the axle includes at least one recess axially distant from the notch.

4. The wheel assembly as defined in claim 3 wherein,
the recess is provided by a circumferentially extending groove dimensioned to receive the teeth of a push-on hat fastener.

5. The wheel assembly as defined in claim 1 wherein,
the outer end of the axle beyond the notch is formed with a cotter pin receiving transverse bore therethrough.

6. The wheel assembly as defined in claim 1 wherein,
the sleeve is mounted in the wheel bore in a manner causing the wheel to rotate with the sleeve; and
the stub end of the axle is provided with a non-circular cross-section formed to provide engagement with an opposing, mating surface of the sleeve to cause the sleeve to rotate with the axle.

7. The wheel assembly as defined in claim 6 wherein,
the sleeve is mounted in an interference fit with the wheel bore to secure the sleeve to the wheel for rotation therewith.

8. The wheel assembly as defined in claim 1 wherein,
the sleeve is formed with a passageway suitable for insertion of a tool therethrough to release the wheel from the axle, and the sleeve includes a resiliently radially outwardly displaceable finger latching the sleeve to the axle with the finger being in axial alignment with the passageway, and the finger having an axially tapered inwardly facing tool engagement surface thereon.

9. The wheel assembly as defined in claim 1 wherein,
the wall defining the opening is formed with a converging entrance to the opening to assist in seating of the stub end of the axle in the opening.

10. The wheel assembly as defined in claim 1, and
an insert member mounted between the wheel bore and the wheel mounting sleeve, the insert member being formed to interfit with one of the sleeve and the wheel in a manner preventing removal of the insert when the sleeve is mounted in the wheel bore.

11. The wheel assembly as defined in claim 10 wherein,
the insert member includes a decorative annular surface mounted in an abutting relation to the exterior surface of the wheel radially outwardly of the wheel bore.

12. The wheel assembly as defined in claim 1 wherein,
the sleeve extends inwardly of the inner side of the wheel to provide an axial spacer concentric to the axle.

13. A wheel mounting sleeve comprising:
a sleeve body formed for mounting into a central wheel bore and having a sleeve bore dimensioned for mounting on an axle;
the sleeve body having at least one axle-engaging shoulder retaining the sleeve on the axle; and
the sleeve body having a transversely extending end wall having an opening therethrough dimensioned to receive an outer stub end of the axle in seated relation thereto for support of transverse loads on the axle by the end wall of the sleeve.

14. The wheel mounting sleeve as defined in claim 13 wherein,
the shoulder is provided on a resiliently outwardly displaceable finger positioned proximate the end wall and formed to engage a circumferentially extending notch in the axle positioned proximate the stub end of the axle.

15. The wheel mounting sleeve as defined in claim 14 wherein,
the finger is progressively thicker in a radial direction and in a direction extending from the distal end toward a proximal end.

16. The wheel mounting sleeve as defined in claim 13 wherein,
the sleeve body includes an extension formed to extend inwardly of the inner side of the wheel by a distance axially spacing the wheel from an apparatus to which the wheel is to be mounted.

17. The wheel mounting sleeve as defined in claim 16, and
a radially extending flange positioned proximate an inner end of the sleeve; and the extension is slotted to enable radially inward resilient displacement of the flange as the sleeve is inserted down the wheel bore.

18. The wheel mounting sleeve as defined in claim 16 wherein,
the extension is formed with at least one opening in a side wall thereof to reduce the quantity of material used to form the sleeve.

19. The wheel mounting sleeve as defined in claim 13 wherein,
the finger is formed with a tapered, inwardly facing surface formed to receive a wheel-releasing tool thereunder.

20. An axle for use with a wheel having a central bore therein terminating in a reduced diameter opening in an exterior side of the wheel, the axle comprising:

an axle body dimensioned for slidable mounting in the bore of the wheel, the axle body having a circumferentially extending notch proximate and inward of a stub end of the axle body, the stub end of the axle body extending beyond the notch and dimensioned for seating in the opening in the exterior side of the wheel, and the stub end of the axle extending beyond the notch by a distance sufficient to laterally support the axle beyond the notch and secure a fastening device to the axle body exteriorly of the wheel.

21. The axle as defined in claim 20 wherein,
the end of the axle body at a position beyond the exterior wall of the wheel includes a recess dimensioned to receive the teeth of a push-on hat fastener.

22. The axle as defined in claim 21 wherein,
the recess is a circumferentially extending groove.

23. The axle as defined in claim 20 wherein,
the outer end of the axle body is formed with a transverse passageway extending therethrough at a position beyond the exterior wall of the wheel, the passageway dimensioned to receive a cotter pin therethrough.

24. The axle as defined in claim 22 wherein,
the outer end of the axle body is formed with a transverse passageway extending therethrough at a position beyond the exterior wall of the wheel, the passageway being dimensioned to receive a cotter pin therethrough.

25. The axle as defined in claim 20 wherein,
the outer wall of the axle body is provided with a non-circular cross-section formed to provide engagement with an opposing planar surface of one of a wheel mounting sleeve and the wheel to cause the axle to rotate with the wheel.

26. The axle as defined in claim 20 wherein,
the axle body is hollow and defines an axle bore formed with at least one shoulder in the axle bore configured to enable attachment of the wheel to the axle by a coupling member formed to be inserted in an open end of the axle bore.

27. A wheel assembly as defined in claim 1, and
a fastening device mounted to the axle beyond the outer side of the wheel and formed to couple the wheel to the axle.

28. The wheel assembly as defined in claim 27 wherein,
the outer end of the axle body beyond the exterior wall of the wheel includes a recess therein dimensioned to receive the teeth of a push-on hat fastener.

29. The wheel assembly as defined in claim 28, and
a push-on hat fastener mounted on the outer end of the axle and coupling the axle to the wheel.

30. The wheel assembly as defined in claim 27 wherein,
the outer end of the axle body includes a transverse bore therethrough positioned outwardly of the outer side of the wheel and dimensioned to receive a cotter pin fastener.

31. The wheel assembly as defined in claim 30, and
a washer mounted on the outer end of the axle between the transverse bore and the outer side of the wheel; and
a cotter pin mounted through the transverse bore.

32. The wheel assembly as defined in claim 27 wherein,
the outer end of the axle includes push-on hat fastener teeth-receiving groove and a transverse cotter pin receiving bore; and
the wheel is coupled to the axle by one of:
a. a mounting sleeve engaging the axle at the notch;
b. a pawl nut engaging the axle at the groove; and
c. a cotter pin engaging the axle at the transverse bore.

33. The wheel assembly as defined in claim 27 wherein,
the axle body is tubular with an open outer end, and
an interior shoulder in the hollow axle body formed for coupling of the wheel to the axle by a fastening member formed to be inserted into the open end and to be interengaged with the shoulder.

34. The wheel assembly as defined in claim 33, and
a fastening member mounted into the open end of the axle and interengaged with the shoulder to couple the wheel to the axle.

35. The wheel assembly as defined in claim 33 wherein,
the outer end of the axle further includes at least one of a push-on hat fastener teeth-receiving groove and a transverse bore; and
the wheel is coupled to the axle by one of:
  a. a fastening member mounted into the open end of the axle and interengaged with the shoulder;
  b. a mounting sleeve engaging the axle at the notch;
  c. a pawl nut engaging the axle at the groove; and
  d. a cotter pin engaging the axle at the transverse bore.

* * * * *